United States Patent
Fotij et al.

[11] Patent Number: 6,138,730
[45] Date of Patent: Oct. 31, 2000

[54] LIGHT METAL RIM RING AND METHOD FOR CONSTRUCTING IT

[76] Inventors: Dimitri Fotij, Paul-Lambertlaan 39, 3630 Maasmechelen; Philippe Blonda, Detmoldlaan 3, 3500 Hasselt, both of Belgium

[21] Appl. No.: 09/142,017
[22] PCT Filed: Feb. 25, 1997
[86] PCT No.: PCT/BE97/00021
  § 371 Date: Aug. 31, 1998
  § 102(e) Date: Aug. 31, 1998
[87] PCT Pub. No.: WO97/31792
  PCT Pub. Date: Sep. 4, 1997

[30] Foreign Application Priority Data

Mar. 1, 1996 [BE] Belgium .................. 09600180

[51] Int. Cl.⁷ .............. B60C 5/16; B60B 21/00; B60B 25/00
[52] U.S. Cl. .............. 152/398; 301/97; 301/98; 301/11.1
[58] Field of Search .................. 301/95, 96, 97, 301/98, 10.1, 11.1, 65, 63.1; 152/396, 398

[56] References Cited

U.S. PATENT DOCUMENTS

| | | |
|---|---|---|
| 2,028,536 | 1/1936 | Eksergian . |
| 2,992,045 | 7/1961 | Martenet ..................... 301/97 |
| 3,228,097 | 1/1966 | Tucker ........................ 301/97 |
| 4,253,514 | 3/1981 | Imamura ..................... 301/97 |
| 4,286,825 | 9/1981 | Sieving ...................... 301/63.1 |
| 4,650,257 | 3/1987 | Woods ........................ 301/97 |
| 5,445,439 | 8/1995 | Dietrich ..................... 301/58 |
| 5,499,864 | 3/1996 | Klein et al. ................ 301/95 |
| 5,653,510 | 8/1997 | Osborne ...................... 301/95 |

FOREIGN PATENT DOCUMENTS

| | | |
|---|---|---|
| 0 031 882 | 7/1981 | European Pat. Off. . |
| 821 236 | 11/1937 | France . |
| 962 318 | 4/1957 | Germany . |
| 89 06 862 | 9/1989 | Germany . |
| 852 246 | 10/1960 | United Kingdom . |
| 2 114 071 | 8/1983 | United Kingdom . |

*Primary Examiner*—S. Joseph Morano
*Assistant Examiner*—Long Bao Nguyen
*Attorney, Agent, or Firm*—Browdy and Neimark

[57] ABSTRACT

A light metal rim ring for vehicle wheels made of an aluminum alloy with at least one multicavitied hollow profile (1) which has a reinforced, in particular a solid portion (2) for the attachment of a wheel disc (3) or spokes. In the method for constructing this rim ring, the multicavitied hollow profile is first extruded and subsequently the extremities are fixed to one another. The use of such a hollow profile enables to construct lighter rim rings. The extremities are preferably connected to one another by means of a diffusion soldering process or an electron beam or a laser beam welding process which permit small wall thicknesses and large differences in wall thickness.

15 Claims, 3 Drawing Sheets

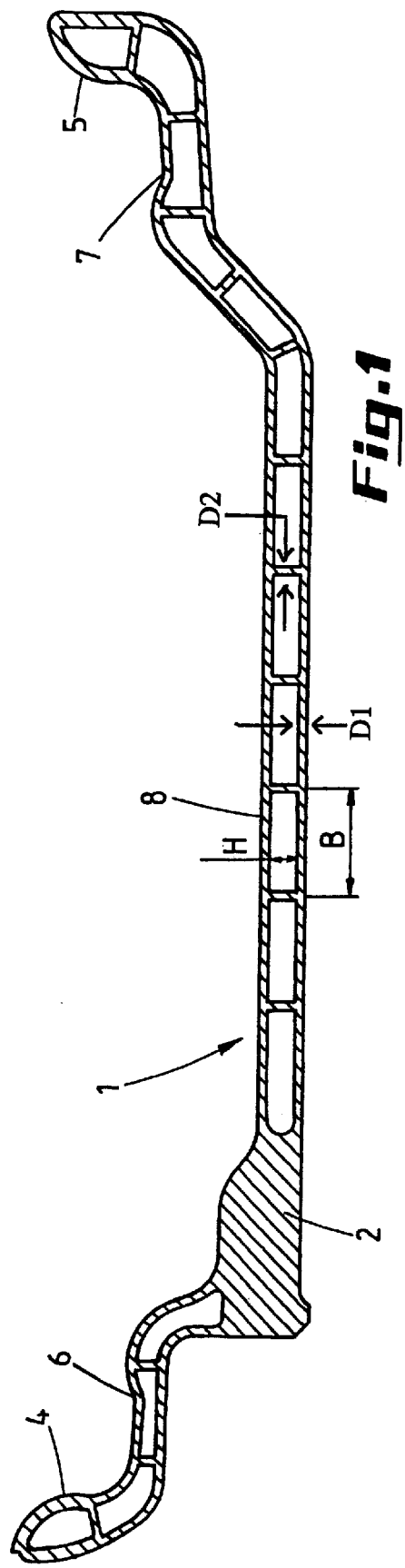

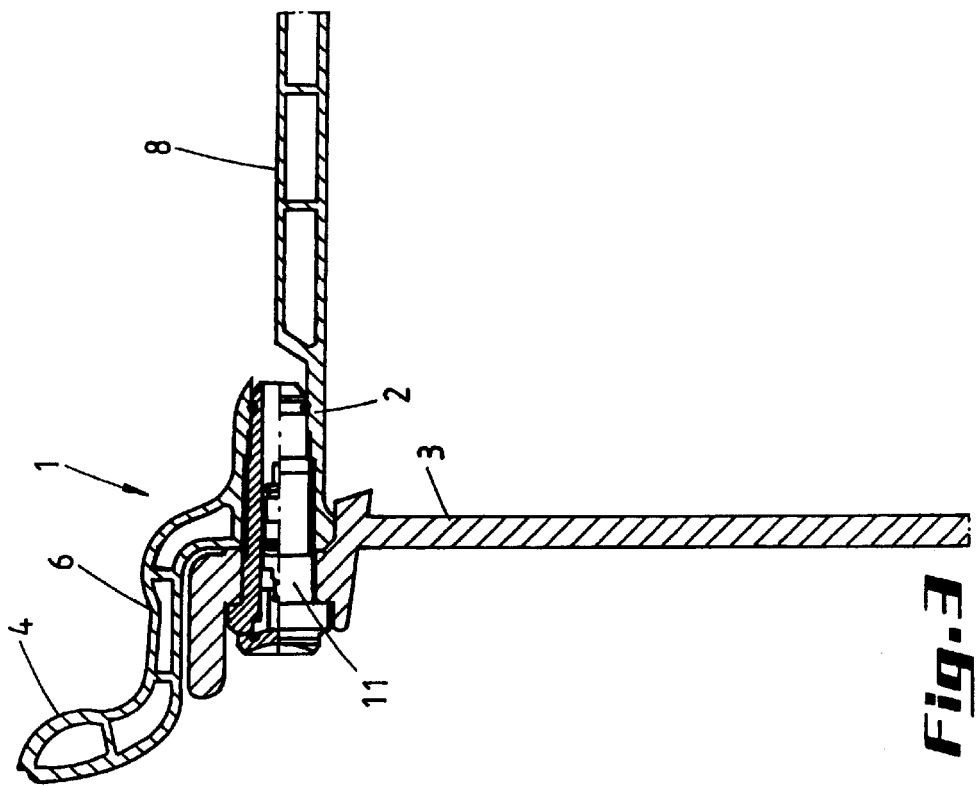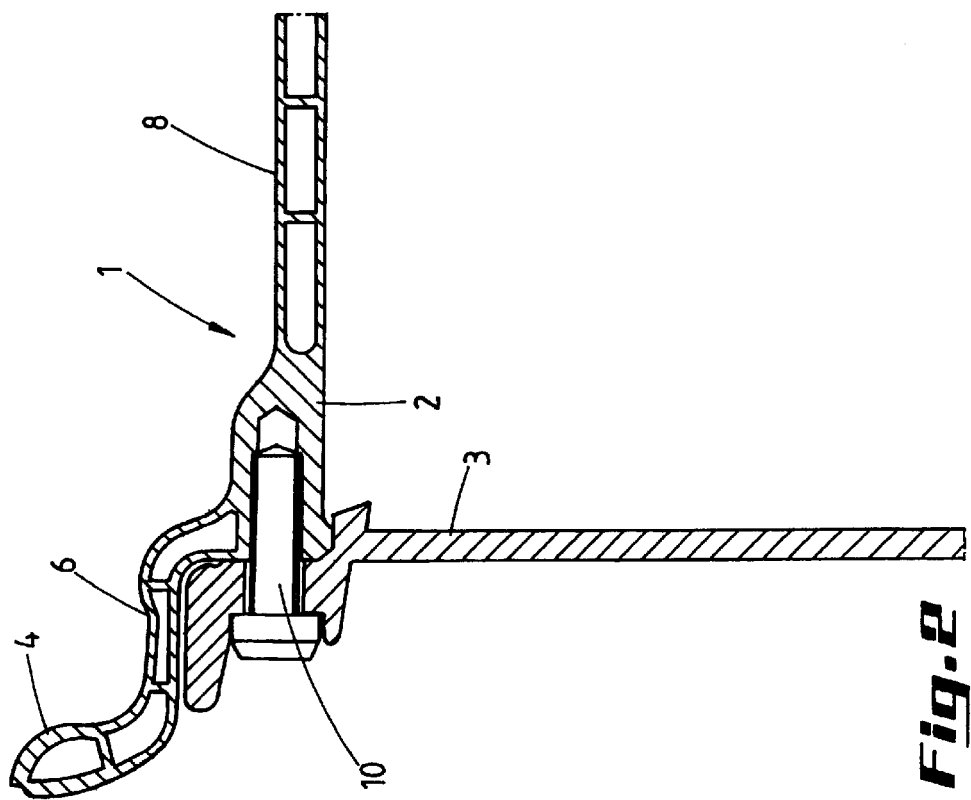

LIGHT METAL RIM RING AND METHOD FOR CONSTRUCTING IT

FIELD OF THE INVENTION

The present invention relates to a light metal rim ring, made of an aluminium alloy, for vehicle wheels, more particularly for wheels of automotive vehicles such as cars, trucks, motor cycles and the like or also for example for trailers thereof.

REVIEW OF RELATED TECHNOLOGY

The rim rings of this type are provided to be fixed by means of a wheel disc or by means of spokes to the wheel hub.

In practice, there is aimed at rendering these rim rings as light as possible while maintaining of course the required strength. By making use of stronger aluminium alloys, it became for example already feasible for cars to construct rim rings having a wall thickness of only 3.6 mm. Less strong alloys, on the contrary, require in practice a thickness of up to for example 5.0 mm.

An object of the present invention is now, however, to provide a new concept of a light metal rim ring for vehicle wheels which enables to achieve, while using the same aluminium alloys, a lighter rim ring complying with the same requirements as to strength.

To this end, the light metal rim ring according to the invention is characterized in that it mainly consists of at least one multicavitied hollow profiled which comprises at least four axial hollow cavities and, a reinforced, in particular a solid portion for the attachment of a wheel disc or spokes.

Notwithstanding the fact that the known solid rim rings are already extremely thin, it has been found according to the invention that it is still possible to realise a further saving of weight by constructing the rim ring from a hollow multicavitied profile.

The use of a hollow multicavitied profile, comprising however less than four hollow cavities, is already known per se for bicycle rims. Usually, these known profiles comprise two so-called pin tunnels in order to fix both extremities of the profile by means of connecting pins to one another. However, it is clear that, in view of the strict balancing which is imposed to vehicle rims, the techniques applied for bicycle rims, in particular the pin connection, can not be applied as such to vehicle rims, all the more because much higher requirements as to strength are imposed to this connection. Also the flash butt welding process, which is applied sometimes for bicycle rims, is much more difficult to apply to rim rings according to the invention because of the big difference in wall thickness between the hollow and the reinforced, portion of the profile, especially when this reinforced portion is solid. As a result thereof, rim rings for automotive vehicles, comprising a reinforced portion for attaching a wheel disc or spokes, are in practice always made by casting or forging which enables however not the use of hollow profiles.

SUMMARY OF THE INVENTION

In a particular embodiment of the rim ring according to the invention, said multicavitied hollow profile has a wall thickness which is, in a cross-section of the profile, for the greater part smaller than 1.5 mm, and in particular a wall thickness of 0.8 to 1.4 mm.

It has been found that with such wall thicknesses it is still possible in practice to achieve, with respect to the known rim rings of only 3.6 mm, a saving of weight when the multicavitied hollow profile, from which the rim ring is constructed, comprises for example cavities showing a ratio between the inner height of the cavity with respect to the width thereof of about 0.4 or smaller.

Although it is still possible with a greater inner height/width ratio to achieve a certain saving of weight, preference is given in a further particular embodiment to a ratio smaller than 0.4.

The smaller this ratio, the larger the saving of weight. The lowermost limit which is technically feasible, depends amongst others of the wall thickness of the hollow profile, the total height of this profile and of course also of the curvature radius under which this profile is to be bent. For car rims, the inner height/width ratio of the profile is in this way usually situated between 0.2 and 0.4 whereas this ratio may possibly still be smaller for larger rims, for example for trucks or busses. The lower limit of the inner height/width ratio can be determined for example experimentally by a person skilled in the art.

The invention also relates to a method for constructing a light metal rim ring according to the invention, wherein at least one multicavitied hollow profile, comprising at least four axial hollow cavities and a reinforced, in particular a solid portion for the attachment of a wheel disc or spokes is extruded, the rim ring is formed from said profile, and the extremities of this profile are fixed subsequently axially to one another.

According to an important aspect of the method according to the invention, the extremities of said light metal profile are welded together by a diffusion soldering process, or by an electron beam or a laser beam welding process.

Compared to the flash butt welding process known for bicycle rims, the above mentioned welding processes offer the advantage of not being influenced by differences in wall thickness and further also of permitting to realise a weld with substantially the same strength as the remaining part of the profile, which is of course of utmost importance for vehicle wheels. These welding processes (diffusion soldering process, electron beam, laser beam welding) enable moreover to weld smaller wall thicknesses of for example 0.8 to 1.4 mm, compared to the flash butt welding process which requires a minimum wall thickness of 1.5 mm.

Further particularities and advantages of the invention will become apparent from the following description of some particular embodiments of the rim ring and the method for constructing this rim ring according to the invention. This description is only given by way of example and is clearly not intended to limit the scope of the invention.

BRIEF DESCRIPTION OF THE DRAWING FIGURES

The used reference numerals relate to the annexed drawings wherein:

FIG. 1 shows a cross-section through a rim ring according to the invention and through a portion of a wheel disc fixed thereto;

FIGS. 2 and 3 show, on a larger scale, a cross-section through a portion of the rim ring according to FIG. 1 and this respectively at an attachment bolt of the wheel disc and at the valve.

DETAILED DESCRIPTION OF THE PREFERRED EMBODIMENTS

Figure 4:
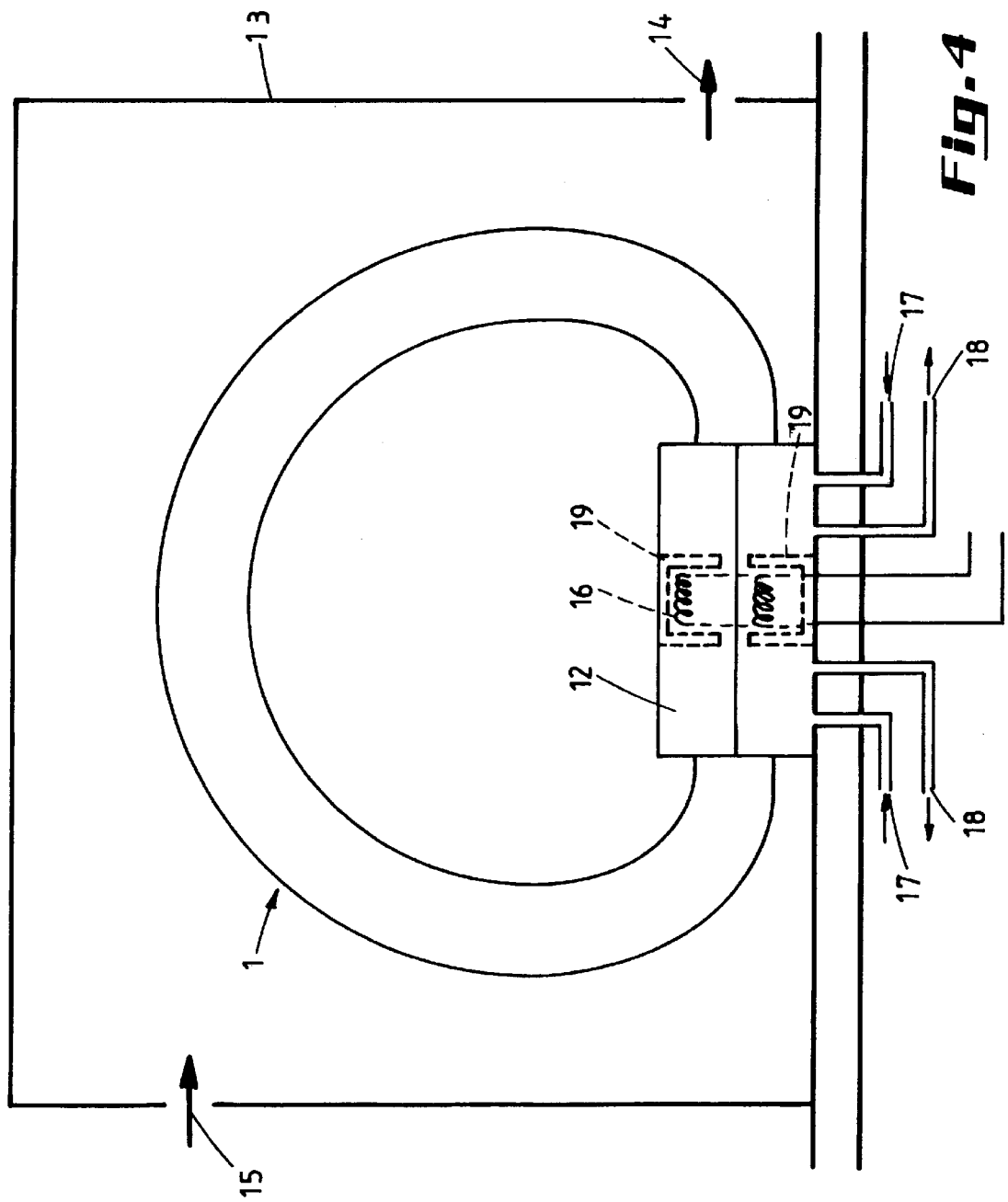
FIG. 4 shows a schematic view of a device for carrying out the diffusion soldering process.

The rim ring shown in FIG. 1 is in particular designed for car wheels but it will be clear that a person skilled in the art can adapt this design to other vehicles such as trucks, motor cycles and the like taking into account the special requirements imposed thereto in particular as to wall thickness and hence as to the strength of the used profiles.

An essential feature of the light metal rim ring according to the invention is that it is mainly constructed of at least one multicavitied hollow profile 1, comprising at least four axial hollow cavities, and the extremities of which are fixed axially against one another. When two or more of such profiles are used for the construction of the rim ring, the extremities have to be fixed of course axially to the corresponding extremities of the adjacent profile. In contrast to bicycle rims, this profile comprises a reinforced, in particular a solid portion 2 for the attachment of a wheel disc 3 or of spokes (not shown). Although, from the point of view of strength, preference is given to a solid portion, it will be clear that the intended reinforced portion may possibly be hollow, in which case this reinforced portion will have for example a thicker wall. As shown in FIG. 2, bolts 10 can be screwed in this reinforced portion for attaching the wheel disc 3. This solid portion can further be used for mounting a valve 11, as it becomes apparent from FIG. 3. Possibly, the wheel disc 3 can however also be welded or pressed against the reinforced portion 2.

The rim ring shown in the figures comprises, in cross-section, a left and a right flange portion 4,5, a left and a right tire seat portion 6,7, a base portion 8 and the reinforced, in the shown embodiment the solid portion 2. In the shown rim ring, all portions except the solid portion 2, are hollow. Optionally, some of these latter portions, such as the flange portions 4,5 could also be made solid in view of the large local forces which are sometimes exerted thereon, for example when removing the tire or when driving against a curbstone. In this respect, the walls of the flange portions 4,5 of the shown embodiment have been made thicker, in particular about 2 mm. For the other walls, a thickness of 1.3 mm may suffice and for the partition walls 9 even a thickness of only 1.0 mm.

More generally, the multicavitied hollow profile has in particular for car or motor cycle rims a wall thickness which is over a cross-section of the profile for the larger part smaller than 1.5 mm and in particular a wall thickness of 0.8 to 1.4 mm. The ratio of the inner height (H) with respect to the width (B) of the cavities of the hollow profile may of course not be too large in order to still enable to achieve a saving of weight. To this end, this ratio is for example smaller than 0.4 and for car rims, this ratio is for example situated between 0.2 and 0.4, more particularly between about 0.25 and 0.3. The lower limit of this ratio can be determined each time experimentally depending on the wall thickness of the profile, the total height of this profile and the curvature radius under which this profile is to be bent.

In the shown embodiment, the cavities of the base portion 8 have for example a width B of 16.9 mm and an inner height H of 4.4 mm. With a wall thickness D1 of the upper and lower wall of this portion 8 of 1.3 mm and with partition walls having a thickness D2 of 1.0 mm, a saving of weight of about 20% is realised in the hollow portion of this base portion 8 with respect to a solid rim having a thickness of 3.6 mm. The overall saving of weight over the total cross-section of the shown rim ring comprises about 22% with respect to the known solid rims with a thickness of 3.6 mm.

As a result of the conditions described hereinbefore, the hollow profile 1 of the rim ring according to the invention comprises in cross-section several hollow cavities, in particular at least four, preferably at least eight and more particularly twelve to twenty hollow cavities. In the shown embodiment, the hollow profile 1 comprises for example sixteen hollow cavities but it will be clear that in practice a greater number of cavities is possible for wider rim rings, such as for example for trucks or busses, even a number greater than twenty.

For constructing the rim ring according to the invention, the multicavitied hollow profile 1 is first extruded. This profile is then bent to the desired curvature, for example by rolling or stretch bending this profile. By means of one or more of these profiles, an open rim ring can thus be formed, after which the extremities of the profile or profiles are welded together to form a closed rim ring. Instead of welding the extremities together, it is possibly also possible to glue them to one another by means of a sufficiently strong metal glue. However, according to the invention, preference is given to welding the different extremities together.

For welding these extremities together, use can for example be made of a flash butt welding process or of other known welding processes. However, it has been found that the use of a diffusion soldering process, an electron beam or a laser beam welding process offers important advantages with respect to such a flash butt welding process or other known welding processes, namely the wall thickness of the cavities may be less than 1.5 mm, the differences in wall thickness over the cross-section of the profile does not cause any problems and the weld has to be finished only to a minimal extend.

Important advantages of the diffusion soldering process, the electron beam or the laser beam welding process are further the formation of a substantially invisible weld and further the possibility of achieving a weld of the same strength as the basic material.

In the diffusion soldering process, the extremities of the multicavitied hollow profile 1 are first removed from the oxides present thereon by immersing them for example for 5 minutes in a 50 g/l NaOH solution at 70° C. and by rinsing them subsequently with deionised water. Removing these oxides is important for permitting to obtain an optimum strength at the weld. Then, a protective layer of a metal is applied on these extremities. This protective layer has to posses the following properties:
low stability of the oxide,
high coefficient of diffusion in the aluminium,
good solubility in aluminium,
small difference in expansion coefficient with respect to aluminium,
easy to apply.

As metal, use can be made for example of silver, copper, zinc or combinations thereof, with preference being given to silver. These metals are easy to apply onto the extremities of the profile in the form of a salt solution, for example a 0.1 M nitrate solution, in particular by immersing them for about 5 seconds in such a solution.

As shown in FIG. 4, the open rim ring, which may consist of one or more parts, is subsequently clamped with the treated extremities in a steel mould 12 and a closed enclosure 13 is applied there around, or at least around the mould 12. In the space enclosed by this enclosure 13, a vacuum is either created or an inert or a reductive atmosphere is applied therein. Performing the diffusion soldering process under such conditions offers the advantage that oxides, which may possibly have been formed with the protective metal before the extremities have been transferred into an oxygen-poor atmosphere, are decomposed again under these conditions. To this end, gas can for example be pumped out of the enclosure 13 through an outlet 14 whilst a mixture of 95% $N_2$ gas and 5% CO gas is fed into the enclosure through an inlet 15.

In order to weld the extremities against one another, use is made in the diffusion soldering process of a combination of pressure and heat. The pressure is achieved by clamping the extremities in the mould 12 and by heating this mould 12 subsequently by means of heating elements 16, each surrounded in the illustrated mould 12 by an insulation 19. As a result of the smaller heat expansion coefficient of the steel mould 12 with respect to that of the light metal profile 1, the extremities of this profile will thus be pressed against one another under a high pressure.

The temperature is selected so as to be higher than the eutectic point of the aluminium alloy wherein the protective metal has diffused under the influence of this high temperature, but lower than the melting point of the aluminium alloy itself. This aluminium alloy has for example a melting point of about 62° C. whereas the eutectic point of this alloy comprising silver diffused therein comprises for example 566° C. By heating to a temperature of for example 580° C., a melt is obtained in this case which provides for a good moistening. Due to the differential expansion of the aluminium alloy and the steel, a pressure of about 150 MPa is moreover generated and maintained for example for 30 minutes.

Then the temperature is lowered for example down to 500° C. and maintained for about 5 minutes. For cooling down everything again, a cooling liquid is circulated via inlets 17 and outlets 18 through the mould 12.

After having removed the closed rim ring from the mould, it is straightened on a not shown expansion mould, which is known per se. Subsequently, the rim ring is subjected during 8 hours for example to an ageing process at a temperature of for example 160° C.

For making the rim ring with electron beam or laser beam welding, use is preferably made of two profiles, in other words two open rim rings halves which are connected to each other.

Laser beam welding can for example be carried out on a three kilowatts YAG-laser (supplier Lumonics). Use is preferably made of fill up material and the welding speeds are situated between three and eight meters per minute. Electron beam welding can for example be carried out by means of a Messer Griesheim electron beam welding machine. This is preferably done under vacuum. For these latter welding processes, a same heat treatment as the one applied for the above described diffusion soldering process, is in particular further carried out. In all three of said welding processes, parts of hollow spaces in the welding area may be reinforced by applying inserts.

From the description given hereinabove, it will be clear that all kinds of modifications can be applied to the illustrated embodiments without departing from the scope of the present invention.

It will for example be clear that the illustrated cross-sections are only to be considered as examples, more particularly of car rims, and that a person skilled in the art is able to adapt them easily to the requirements imposed for example to wheels of motor cycles or trucks, in particular as to strength and hence as to wall thickness of the profile.

What is claimed is:

1. A light metal rim ring for vehicle wheels having an axis, being made of an aluminum alloys and comprising
    at least one multicavitied hollow profile which exhibits two opposite lateral sides and which comprises a reinforced portion for attachment of wheel hub attaching means and at least four hollow cavities formed in a circumferential configuration and extending next to one another in a direction, parallel to the axis, from one of said lateral sides to the other of said lateral sides.

2. The light metal rim ring as claimed in claim 1, wherein said multicavitied hollow profile is extruded.

3. The light metal rim ring as claimed in claim 1 wherein said multicavitied hollow profile has a wall thickness which is, in a cross-section of the profile, for the greater part smaller than 1.5 mm, and in particular a wall thickness of 0.8 to 1.4 mm.

4. The light metal rim ring as claimed in claim 1, wherein said multicavitied hollow profile comprises cavities having a width and an inner height and showing a ratio between said inner height with respect to the width which is smaller than 0.4.

5. A method for constructing a light metal rim ring for vehicle wheels having an axis, being made of an aluminum alloy, and comprising
    at least one multicavitied hollow profile which exhibits two opposite lateral sides and which comprises a reinforced portion for attachment of wheel hub attaching means and at least four hollow cavities formed in a circumferential configuration and extending next to one another in a direction, parallel to the axis, from one of said lateral sides to the other of said lateral sides;
    wherein said multicavitied hollow profile comprises, in cross section, at least eight hollow cavities.

6. The light metal rim ring as claimed in claim 5, wherein said multicavitied hollow profile comprises, in cross-section, twelve to twenty hollow cavities.

7. The light metal rim ring as claimed in claim 1 wherein said reinforced portion is a solid portion.

8. A method for constructing a light metal rim ring for vehicle wheels having an axis, being made of an aluminum alloy, and comprising
    at least one multicavitied hollow profile which exhibits two opposite lateral sides and which comprises a reinforced portion for attachment of wheel hub attaching means and at least four hollow cavities formed in a circumferential configuration and extending next to one another in a direction, parallel to the axis, from one of said lateral sides to the other of said lateral sides;
    wherein at least one multicavitied hollow profile which shows two extremities and two opposite lateral sides and which comprises a reinforced portion for the attachment of wheel hub attaching means and at least four axial hollow cavities which extend next to one another in a direction from one of said lateral sides to the other is extruded, the rim ring is formed from said profile, and the extremities of this profile are fixed subsequently axially to one another.

9. The method as claimed in claim 8, wherein the extremities of said light metal profile are welded together by a process selected from the group consisting of a diffusion soldering process, an electron beam welding process, or a laser beam welding process.

10. The method as claimed in claim 9, wherein the extremities of said light metal profile are welded together by a diffusion soldering process wherein oxide is removed from these extremities, a protective layer of a metal which is able to diffuse in the light metal formed by an aluminium alloy is applied onto the extremities removed from oxide, said extremities are clamped in a mould having a smaller coefficient of expansion than the aluminium alloy, and this mould and the extremities clamped therein are heated up to a temperature higher than the eutectic point of the aluminium alloy wherein said metal is diffused but lower than the melting point of the aluminium alloy itself.

11. The method as claimed in claim 10, wherein a protective layer of at least one metal from the group consisting of silver, copper, and zinc is applied onto the extremities removed from oxide.

12. The method as claimed in claim 11, wherein a protective layer of silver is applied onto the extremities removed from oxide.

13. The method as claimed in claim 10, wherein said protective layer is applied in the form of a salt solution, of said metal onto the extremities removed from oxide of said profile and the diffusion soldering process is performed under conditions selected from the group consisting of a vacuum, inert atmosphere, or a reductive atmosphere. A light metal rim ring for vehicle wheels having an axis, being made of an aluminum alloy, and comprising at least one multicavitied hollow profile which exhibits two opposite lateral sides and which comprises a reinforced portion for attachment of wheel hub attaching means and at least four hollow cavities formed in a circumferential configuration and extending next to one another in a direction, parallel to the axis, from one of said lateral sides to the other of said lateral sides.

14. The method as claimed in claim 8, wherein said profile is extruded in the form of a multicavitied hollow profile having a wall thickness which is, in a cross-section of the profile, for the greater part smaller than 1.5 mm, and in particular a wall thickness of 0.8 to 1.4 mm.

15. The method as claimed in claim 8, wherein said profile is extruded in the form of a multicavitied hollow profile having cavities showing a ratio between the inner height of the cavity with respect to the width thereof smaller than 0.4.

* * * * *

UNITED STATES PATENT AND TRADEMARK OFFICE
CERTIFICATE OF CORRECTION

PATENT NO. : 6,138,730
DATED : October 31, 2000
INVENTOR(S) : Dimitri Fotij et al Page 1 of 2

It is certified that error appears in the above-indentified patent and that said Letters Patent is hereby corrected as shown below:

Column 5, line 59 (claim 1), delete "alloys" and insert therefor --alloy--;

Column 5, line 66 (claim 1), delete ", parallel to the axis,";

Column 6, line 13 (claim 5), delete "method for constructing a";

Column 6, line 14 (claim 5), delete "having an axis, being";

UNITED STATES PATENT AND TRADEMARK OFFICE
CERTIFICATE OF CORRECTION

PATENT NO. : 6,138,730
DATED : October 31, 2000
INVENTOR(S) : Dimitri Fotij et al It is certified that error appears in the above-indentified patent and that said Letters Patent is hereby corrected as shown below:

Column 6, lines 16-17 (claim 5), delete "which exhibits two opposite lateral sides and";

Column 6, lines 19-21, delete "and at least . . . of said lateral sides";

Column 6, line 14 (claim 5), after "cavities" insert --formed in a circumferential configuration--;

Column 6, line 36 (claim 6), after "direction", delete ", parallel to the axis,"

Signed and Sealed this

Thirteenth Day of March, 2001

Attest:

NICHOLAS P. GODICI

Attesting Officer    Acting Director of the United States Patent and Trademark Office